April 19, 1932.  C. H. HAPGOOD  1,854,305
MILKING MACHINE
Filed Dec. 24, 1927   2 Sheets-Sheet 1

WITNESS:

INVENTOR
Cyrus Howard Hapgood
BY
ATTORNEYS.

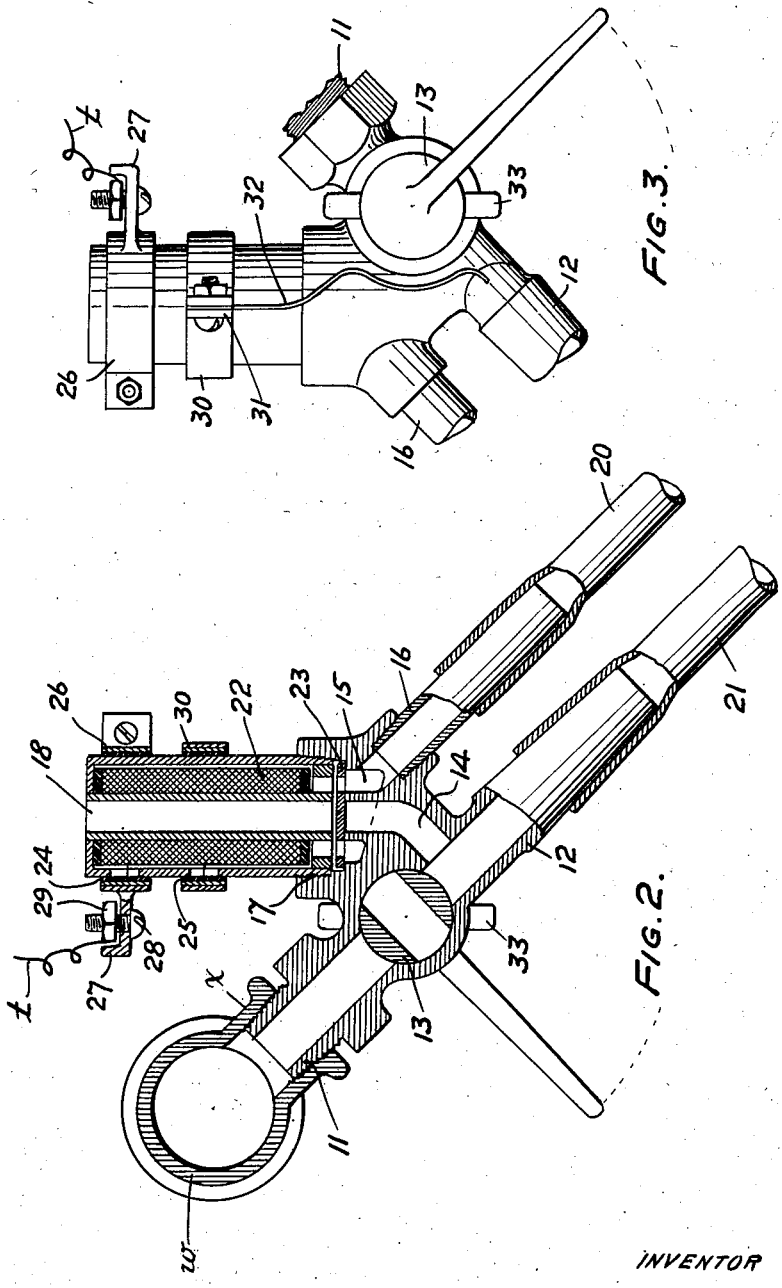

Patented Apr. 19, 1932

1,854,305

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

MILKING MACHINE

Application filed December 24, 1927. Serial No. 242,331.

It is known in the art to provide a milking machine comprising a double-chambered teat cup, a pulsation pipe and a secondary pneumatic pulsator connected with, and controlled in its operation by the pulsations in, said pipe, and connected with, and producing pulsations in, the outer chamber of the teat cup, and to provide a vacuum and milk pipe connection from the inner teat cup chamber through the milk claw to the milk pail. It is also known, in such a construction, to provide a vacuum pipe line from the milk pail to the vacuum pump, a primary pneumatic pulsator adapted to produce pulsations in a pipe connected with the secondary pulsator, and electrically operated means, controlled from the pump, for operating the primary pneumatic pulsator. The pulsations from the primary pneumatic pulsator may convey pulsations direct to the outer teat cup chamber, but it is distinctly preferable to provide two pneumatic pulsators, one, a primary pulsator, being directly operated by the electrically operated means and in turn operating another, or secondary pulsator, which produces the pulsations that are conveyed to the outer teat cup chamber. Such a milking machine is disclosed in the Daysh and Hapgood patent, No. 1,405,104, dated January 21, 1922.

In the present invention, which has for its object to improve the Daysh-Hapgood invention, two separate hose (preferably so integrally connected that they can be handled as a unit) are provided, corresponding ends of which are connected to the milking machine unit, one of the hose being adapted to function as a vacuum hose and the other as a pulsation hose; the other ends of the hose being mechanically connected to the vacuum pipe line. The primary pneumatic pulsator and the electrically operating means (e. g., an electro-magnet) for controlling the operation of such pulsator are located at about the junction between the vacuum pipe and the hose when the latter is in operative position, the milking machine being rendered operative when the cock controlling the flow of air through the vacuum hose is opened.

A preferred embodiment of the invention is shown in the drawings, in which:

Fig. 2 is a section through the vacuum tube, the hose, the connector between them, and the pneumatic pulsator and electromagnet.

Fig. 3 is a side elevation of the connector and the electromagnet casing carried thereby.

Figure 1:
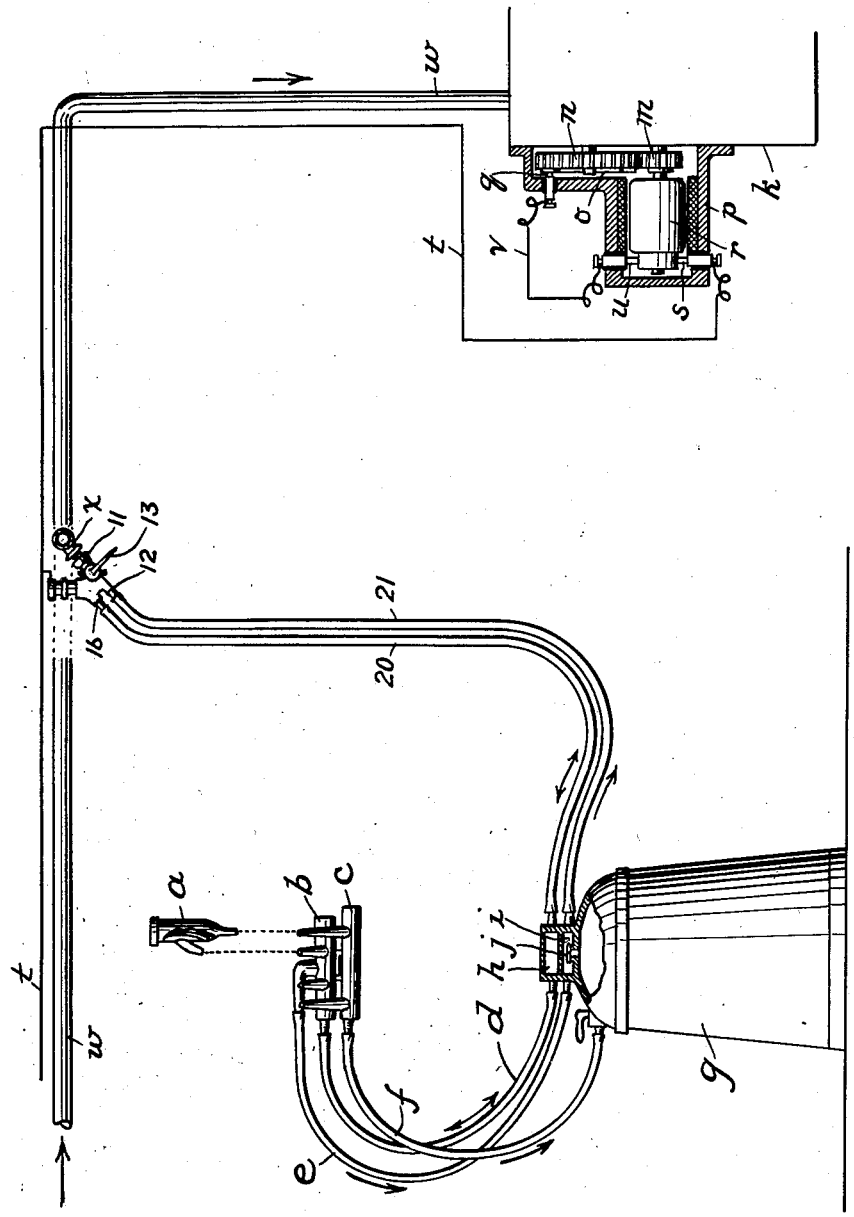
Fig. 1 is a side elevation, partly in section, of a complete milking machine.

The secondary pneumatic pulsator (which is preferably but not necessarily employed) may be of the construction shown in the Leitch Patent No. 1,255,186, dated Feb. 5, 1918. It comprises (see Fig. 1) a tubular casing $b$ forming a pulsation chamber communicating with a pulsation pipe $d$ and with a vacuum pipe $e$ and having nipples for connection with the pulsation chambers of the teat cups $a$; a pulsator valve in said chamber operable by pneumatic pulsations communicated through pulsation pipe $d$; and a tubular casing forming a milk chamber $c$ communicating with a milk pipe $f$ and having nipples adapted for connection with the milk chambers of the teat cups. Milk pipe $f$ connects with the interior of the milk pail $g$. If a secondary pulsator is not employed, pipe $d$ may be directly connected to the outer chambers of the teat cups.

On the cover of the milk pail is a casing divided by a web into a pulsator chamber $h$ and a vacuum chamber $i$. The vacuum chamber communicates, through one or more check valves $j$, with the interior of the milk pail. The chambers $h$ and $i$ have nipples adapted to respectively receive the hose 20 and the hose 21, which, while shown as independent tubes, may be integrally connected so as to be handled as a unit.

The vacuum pump $k$ (which may be of the type shown in the Leitch Patents 1,367,554 and 1,378,881 and the Hall Patent 1,374,650 and is diagrammatically shown in Fig. 1) has a pinion $m$ which is in driving connection with a gear $n$ carrying a semi-circular contact strip $o$. Affixed to the pump casing is a casing $p$ enclosing an electric generator $r$ as well as pinion $m$ and gear $n$. When the milking machine is in operation, one of the brushes *s* of the generator is connected, through an electric conducting line *t* and other electrical connection hereinafter described, with one terminal of the magnet that actuates the primary pneumatic pulsator, to be also hereinafter described. The other brush *u* of the generator is connected, through an electrical connection *v* with a brush *q* carried on the pump casing and adapted, in the rotation of gear *n*, to intermittently contact with contact strip *o*, from which, through the pump casing, the current flows through the vacuum pipe line *w*.

Vacuum pipe *w* is provided with any desired number of nozzles *x*, which are threaded to receive a connector. This connector comprises a nozzle 11 adapted to be threaded into any nozzle *x*, a nozzle 12 adapted to receive the end of the vacuum hose 21 (nozzles 12 and 11 forming a conduit for passage of air from hose 21 to vacuum pipe *w*), a valve 13 in said conduit, an air passage 14 from nozzle 12, a pulsation passage 15, and a nozzle 16 connected with passage 15 and adapted to receive the end of the pulsation hose 20.

The connector is also provided with a socket 17 in which is threaded the lower end of an iron-enclosed electro-magnet 22. The field winding of the magnet surrounds a vertical tube 18 which, at its upper end, is open to the atmosphere or other source of relatively high pressure. The armature 23 of the magnet, which also functions as the valve of a pneumatic pulsator, is positioned in the bottom of the socket 17 below the open lower end of tube 18.

Passages 14 and 15 communicate with socket 17. When the armature valve 23 has dropped into the lower position shown in Fig. 2, it closes the passage 14 and opens the passage in tube 18. The armature valve has a port or ports registering with passage 15 and when in its lower position atmospheric air flows through tube 18, the port or ports in armature valve 23, passage 15 and nozzles 16 into pulsation hose 20.

When the armature valve 23 is thrown into its upper position by the excitation of the field winding of the magnet, it closes tube 18 and opens the passage 14 and (if nozzle 12 is connected with suction), air flows from hose 20 through nozzle 16, passage 15, under armature valve 23 and through passage 14 into nozzle 12.

The terminals of the field winding of the magnet extend through holes in the magnet casing and respectively through rings 24, 25 of insulating material sleeved on the magnet casing to metal rings 26, 30 sleeved on rings 24, 25 respectively. Ring 26 carries a bracket 27, which carries a screw 28 on which is a nut 29, by means of which one end of conducting wire *t* is secured to the bracket 27. Ring 30 has ears 31 between which is clamped an elastic and flexible contact finger 32. This finger is adapted to be engaged by one of the lugs 33 on valve 13 when the latter is turned from the closed position shown in Figs. 2 and 3 to an open position, thereby closing the electric circuit from brush *u* through connection *v*, brush *q* and contact strip *o* (when the two latter are in contact), pump casing, vacuum tube *w*, nozzle 11, valve 13, lug 33, contact finger 32, and ring 30 to one pole of the magnet, and from the other pole of the magnet through ring 26, bracket 27 and conducting wire *t* to brush *s*.

From the foregoing description it will be understood that when the opposite ends of the double hose 20, 21 are connected to the double-chambered casing on the pail and to the connector carried by the vacuum tube *w*, the only operation required to start the machine is to open the valve 13. This opens the connection between the vacuum pipe *w* and vacuum hose 21 and at the same time closes the circuit through the magnet. Thereafter the electric circuit is alternately opened and closed by the primary electric pulsator (brush *q* and contact segment *o*) and the magnet alternately energized and de-energized. The pneumatic pulsator (armature valve 23) is lifted when the magnet is energized and is drawn down by the constant suction in passage 14 and by gravity when the magnet is de-energized, thereby producing pneumatic pulsations in the pulsation hose 20. These pneumatic pulsations are transmitted through chamber *h* and pipe *d* either direct to the pulsation chambers of the teat cups, or preferably, as shown, to the secondary pneumatic pulsator *b*.

While the provision whereby the operation of the valve 13 automatically closes the electric circuit is of value and importance, the invention in its broader aspect, is not limited to a construction involving this particular mode of operation, since it is obvious that the invention exhibits other novel features and possesses other advantages.

Having now fully described my invention, what I claim and desire to protect by Letters Patent is:—

In a milking machine, the combination with a vacuum pipe adapted to be connected with a source of suction, a connector connected with the vacuum pipe and having a vacuum conduit which at one end is adapted to communicate with the vacuum pipe and which is provided with two branches one of which is adapted for connection with an element in which it is desired to establish continuous vacuum and the other of which opens in an upward direction, the connector having also a pneumatic pulsation conduit one end of which is adapted for connection with an element in which it is desired to establish pneumatic pulsations and the other end of which opens alongside the said upwardly open branch of the vacuum conduit, and an electrically controllable pulsator valve adapted to seat on the upwardly open ends of the two conduits and to connect the pulsation conduit with a source of pressure when seated and to connect the branch vacuum conduit and the pulsation conduit when unseated.

In testimony of which invention, I have hereunto set my hand, at city of New York, New York, on this 20th day of December, 1927.

CYRUS HOWARD HAPGOOD.